United States Patent [19]
Curtis

[11] 3,981,274
[45] Sept. 21, 1976

[54] HORSE WALKER HAVING A CONTINUOUSLY VARIABLE TRANSMISSION AND FOLDING BOOMS

[76] Inventor: Terry W. Curtis, R.R. No. 1, Box 45, Albany, Ill. 61230

[22] Filed: July 31, 1975

[21] Appl. No.: 600,261

[52] U.S. Cl. .................................. 119/29; 272/39
[51] Int. Cl.² ....................................... A01K 15/00
[58] Field of Search .......................... 119/29, 14.04; 272/39–41

[56] References Cited
UNITED STATES PATENTS

| | | | |
|---|---|---|---|
| 2,572,859 | 10/1951 | Hall | 272/40 X |
| 2,831,457 | 4/1958 | McMurry | 119/29 |
| 3,424,132 | 1/1969 | Fischer et al. | 119/29 |
| 3,773,018 | 11/1973 | Profughi | 119/29 |

Primary Examiner—J.N. Eskovitz
Attorney, Agent, or Firm—Glenn H. Antrim

[57] ABSTRACT

Folding booms are attached to a hub and wheel. The drive wheel of an electric motor contacts a plane face of the wheel, and the motor is mounted to move the drive wheel radially over the face of the wheel. Movement of the motor causes change in speed of rotation of the booms, the drive arrangement functioning as a continuously variable transmission. The drive wheel also functions as a clutch to limit the force to be applied to an animal that is being led. To provide clearance for fire equipment and other vehicles, the booms can be folded or raised upwardly about mounting hinges. The force required for folding is applied by a hydraulic jack operating through a central shaft and cables.

7 Claims, 8 Drawing Figures

HORSE WALKER HAVING A CONTINUOUSLY VARIABLE TRANSMISSION AND FOLDING BOOMS

BACKGROUND OF THE INVENTION

This invention relates to mechanical devices for leading animals and particularly to horse walkers that have continuously variable transmissions and that have booms that fold upwardly.

Horse walkers are commonly used at race tracks for exercising horses and for leading them during their training. A usual horse walker has four booms radiating outwardly from a vertically disposed hub. The booms are fixed horizontally, and the hub for rotating the booms is rotated by an electric motor through a transmission. Transmissions that have been used include either worm gears or gear systems similar to those used in automobiles. As the booms are rotated, one or more horses are led by halter straps that are connected to the distal ends of the booms.

Horse walkers may have special features. One type of horse walker has a separate clutch between a transmission and a rotative hub to prevent animals that are being exercised from injury by excessive pulling forces. Through control of either a transmission or a motor, the speed and direction of rotation of the booms can be controlled. Since horse walkers are commonly transported from one location to another, a known type has means for mounting the booms such that the booms can be rotated horizontally to a nesting position to aid in loading.

SUMMARY OF THE INVENTION

An object of the present invention is to provide a horse walker with a continuously variable transmission that is reliable and inexpensive to manufacture and that also functions as a clutch for protecting the animals tied to the horse walker.

Another object is to mount the booms of the horse walker so that they can be folded upwardly and to provide means for readily folding the booms to leave an unobstructed area about the base of the horse walker.

A feature of the present horse walker to aid in its transportation is its construction that permits easy disassembly into light pieces of relatively small dimensions.

In the present horse walker, a standard supports a rotative wheel and hub. The wheel has a horizontal plane face that is in contact with a drive wheel mounted on a shaft of a motor. The motor has an adjustable mounting for moving the motor axially with respect to the wheel so that the distance of the drive wheel from the hub can be changed. Through variation of the position of the motor, the drive functions as a continuously variable transmission for rotating booms attached to the hub over a wide range of rates.

The booms are rotated at a desired rate according to the positioning of the motor. The booms may be secured in a horizontal position, but in a preferred embodiment, the inner ends of the booms are hinged to the hub in a manner that permits the booms to be folded upwardly. The booms at points spaced from their mounting hinges are connected by cables to the top of an inner raising shaft. The inner raising shaft is coaxial with the hub and it is supported by having its lower end rest on the movable member of a hydraulic jack. As the jack is extended, the booms are folded about their hinges to be changed from the horizontal position to a vertical position. This feature is particularly important about a race track where the booms may need to be folded quickly to allow passage of firefighting equipment, and it is useful at other times to permit space for usual trucking services.

Another feature is its construction for facilitating assembly and disassembly. When the horse walker is to be transported, the booms can be removed from the hub; the hub can be removed from the standard on which it is mounted, and the motor and the base and its braces can readily be removed from the standard. Every piece is then light enough to be easily lifted by hand and small enough to be loaded on to a small truck or trailer.

DESCRIPTION OF THE PREFERRED EMBODIMENT

Figure 1:
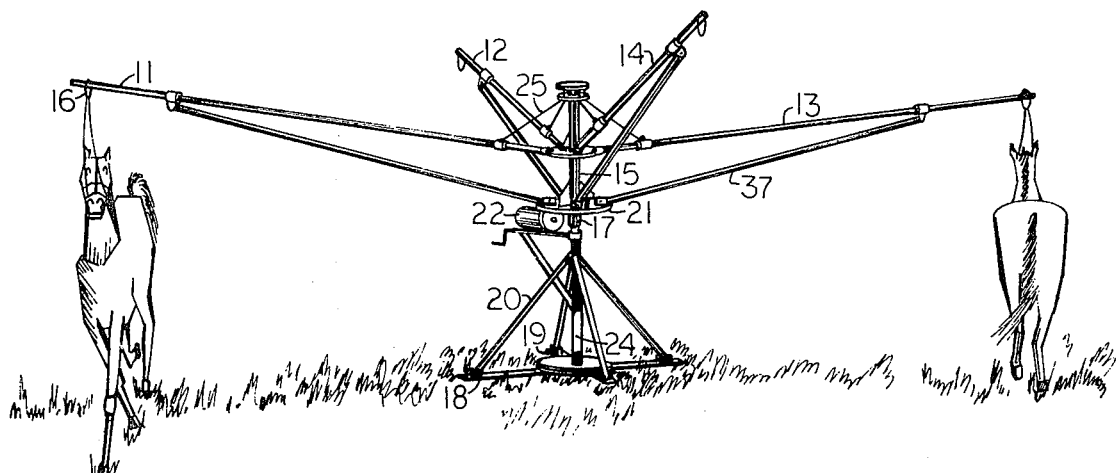
FIG. 1 is a perspective view of the present horse walker with its booms in a horizontal position.

With reference to FIG. 1, a preferred horse walker has four booms 11–14 extending radially from a rotative hub 15. A strap 16 in the form of a loop may be connected to the outer end of each of the booms 11–14 to which the strap of a halter or bridle may be easily tied. Customarily, the length of the booms 11–14 is such that animals connected to the booms are led in a circle that is about 30 feet (9.1 m) in diameter. The hub 15 is mounted coaxially on a stationary, upright standard 17. The standard 17 is a length of 4-inch iron pipe that is supported in an upright position by a pair of crossbars 18–19 and four braces 20. A driven wheel 21 at the bottom of the hub 15 is rotatively mounted on a standard 17 and is driven by an electric motor 22. As described in detail below, the motor 22 has a drive wheel 50 in contact with a smooth lower surface of the driven wheel 21, and the position of the motor is adjustable radially to determine the speed of rotation of the booms 11–14.

Figure 2:
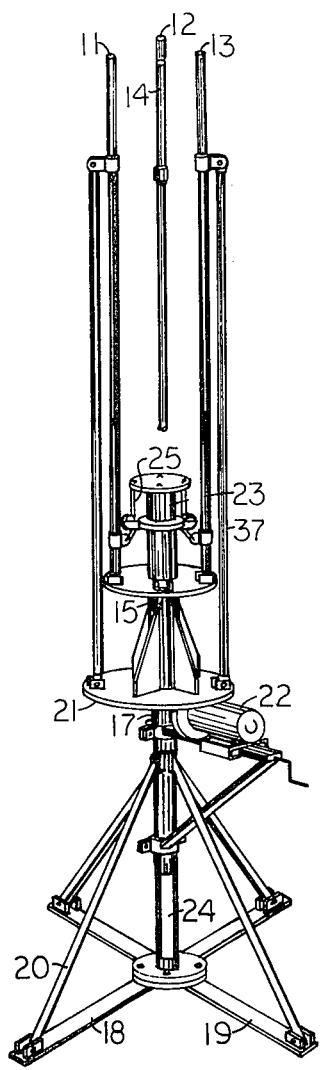
FIG. 2 is a perspective view of the horse walker of FIG. 1 with its booms folded in a vertical position.

The booms 11–14 can either be connected to the hub 15 in a customary manner such that the booms are always fixed in a horizontal, useable position, or as shown in the preferred embodiments in FIGS. 1 and 2, the booms 11–14 can be hinged to the hub 15 to permit the booms to be raised as shown in FIG. 2 from the horizontal position to a vertical position for providing clearance. As described in detail below, a raising shaft 23 is a sliding fit within the standard 17. The lower end of the raising shaft 23 rests on the movable member of a jack 24 mounted within a bottom section of the standard 17. While the jack 24 is retracted, the upper end of the raising shaft 23 is nearly even with the upper end of the standard 17. Cables 25 extend between the booms 11–14 and the upper end of the raising shaft 23. When the jack 24 is extended, the raising shaft 23 is raised to pull on the cables 25 and to raise the booms 11–14 to the position shown in FIG. 2.

Figure 3:
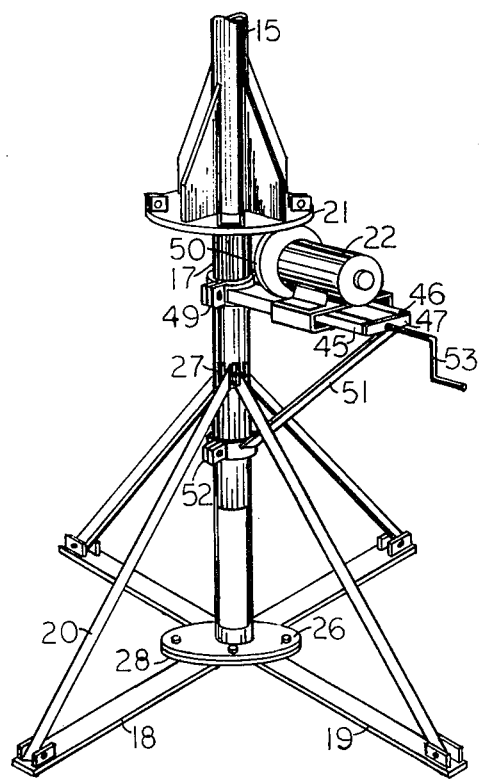
FIG. 3 is a perspective view of the lower portion of the horse walker to show the base for a standard and a motor for rotating the booms.

The components of the horse walker are designed to facilitate assembly after the unassembled horse walker is transported. The method and order of assembly will become apparent with reference to the following detailed description. With reference to FIG. 3, for mounting the standard 17 upright, the standard has a mounting disk 26 welded to its lower end (FIGS. 3 and 5), and has four spaced angle irons or clip angles 27 secured to the standard at a suitable distance from the disk to retain braces 20. Most of the parts of the horse walker are fabricated from iron or steel. The base that rests on the ground comprises a pair of channel iron pieces 18 and 19 arranged as a cross arm. A disk 28 is secured at the center of the cross arm, and the disk 26 is bolted on top the disk 28. A clip angle 29 is welded to each end of the arms 18 and 19, and a brace 20 fabricated from 1½-inch angle iron is bolted between a clip angle 29 of the cross arm and a clip angle 27 that is secured to the standard 17.

Figure 5:
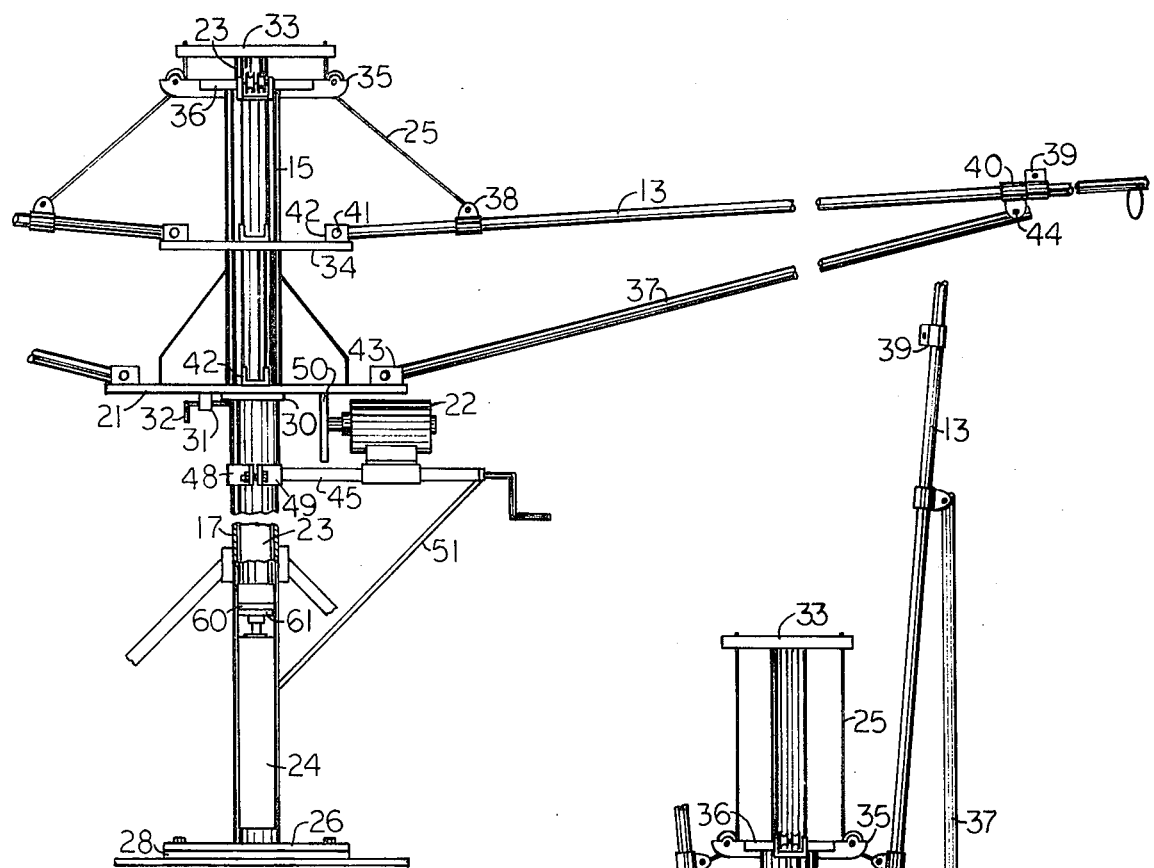
FIG. 5 is a fragmentary plan view of the horse walker to show one of its booms, and means for lifting the booms.
Figure 4:
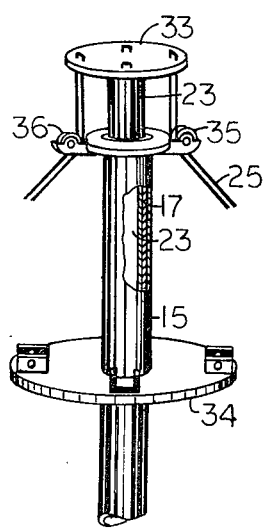
FIG. 4 is a fragmentary view of the upper portion of the standard of the horse walker.

With reference to FIGS. 3, 4, and 5, the hub 15 with the driven wheel 21 facing downwardly slides down over the top of the standard 17 to rest on a supporting ring 30 (FIG. 5). The ring 30 is welded about the standard 17 where required to support the wheel 21 at the desired height. To prevent the hub 15 from being lifted when the jack 24 is operated to raise the booms 11–14, a block 31 is secured to the lower face of the driven wheel 21 where it will be a short distance outside the perimeter of the supporting ring 30. The block extends a sufficient distance below the ring to accommodate a pin or a bolt 32 that has one end directed inwardly slightly below the outer lower edge of the supporting ring 30. The hub 15 and wheel 21 are therefore free to rotate but are kept from being lifted by the pin 32 as it bears against the lower surface of the ring 30.

The hydraulic jack 24 is inserted within a cutout at the bottom of the standard 17 such that it is positioned coaxially within the bottom of the standard with its base resting against the mounting disk 26. The raising shaft 23 is fabricated from 4-inch tubing and is a sliding fit within the standard 17 fabricated from 4-inch pipe. A disk 33 that is hereinafter referred to as a raising disk, has its center portion welded to the upper end of the raising shaft 23. The raising shaft 23 is inserted within the standard 17, and its length is such that when the jack 24 is retracted or nearly retracted that the raising disk 33 rests on the top of the standard 17 (FIG. 4) while the lower end of the raising shaft 23 rests on the top of the movable member of the jack 24. Mating thrust plates 60 and 61 (FIG. 5) attached to the lower end of the raising shaft 17 and the top of the movable member of the jack 24 respectively function as a thrust bearing to permit easy rotation of the raising shaft 23.

With refrence to FIG. 5, the hub 17 extends somewhat less than a meter above the wheel 21, and at an intermediate distance between the wheel 21 and its upper end has a mounting ring 34 for supporting the inner ends of the booms 11–14. Each of the cables 25 for the respective booms 11–14 are guided by a separate pulley 35 fastened to the top of the standard 17. Conveniently, a ring 36 that has a smaller diameter than that of the intermediate mounting ring 34 is welded to the top of the standad 17, and the pulleys 35 are equally spaced about the perimeter of the ring 36.

Each of the four booms 11–14 has an inner end connected to the upper edge of the intermediate mounting ring 34 and a brace 37 that has an inner end connected to the upper edge of the driven wheel 21. Also each of the booms 11–14 has a clamp 38 to which the cable 25 for raising is attached and another clamp or stop 39 for determining the lower position of the boom. In detail with reference to the boom 13, the clamp 38 is positioned such that the distance between the clamp and the inner end of the bore 13 is about equal to the distance between the intermediate mounting ring 34 and the pulley ring 36. The stop 39 is positioned such that a sleeve 40 attached to the outer end of the brace 37 bears against the stop to support the boom 13 in a horizontal position.

The boom 13 and the brace 37 may be fabricated from 1¼-inch pipe. The inner end of the boom 13 is attached to the intermediate mounting ring 34 by a bolt 41 that is inserted through a U-shaped piece of iron 42 and the inner end of the boom 13 to provide a hinged connection. The base of the U-shaped or clevis-shaped piece of iron has its base welded to the upper edge of the ring 34. The inner end of the boom 13 is squared, and the distance between the turned-up ends of the piece 42 is slightly greater than the distance across the squared end of the boom 13. The inner end of the brace 37 is squared in a like manner and is connected to the upper edge of the driven wheel 21 by a U-shaped piece 43 that is similar to the piece 42.

The sleeve 40 is a sliding fit on the boom 13, and it has a pair of parallel, triangular extensions directed downwardly for receiving a bolt 44 that passes through an outer squared end of the brace 37 to form a hinged connection. The clamp or stop 39 comprising a strap and a bolt and is secured about the boom 13 where required such that the outer end of the sleeve 40 bears against the stop 39 to support the boom 13 in its horizontal position.

With reference to FIGS. 4 and 5, one end of the cable 25 is connected to the clamp 38 of the boom 13; the cable is threaded through the frame of the pulley 35 past one of its wheels, up through a hole in the edge of the raising disk 33, down through an adjacent hole through the edge, down through the pulley past the other of its wheels; and the other end of the cable 25 is connected to the clamp 38 such that the cable 25 is taut, or nearly taut, while the boom 13 is held in its horizontal position by the stop 39. Each of the booms 11–14 is assembled to the hub 15 and to the raising disk 33 as described for the assembly of the boom 13.

Figure 6:
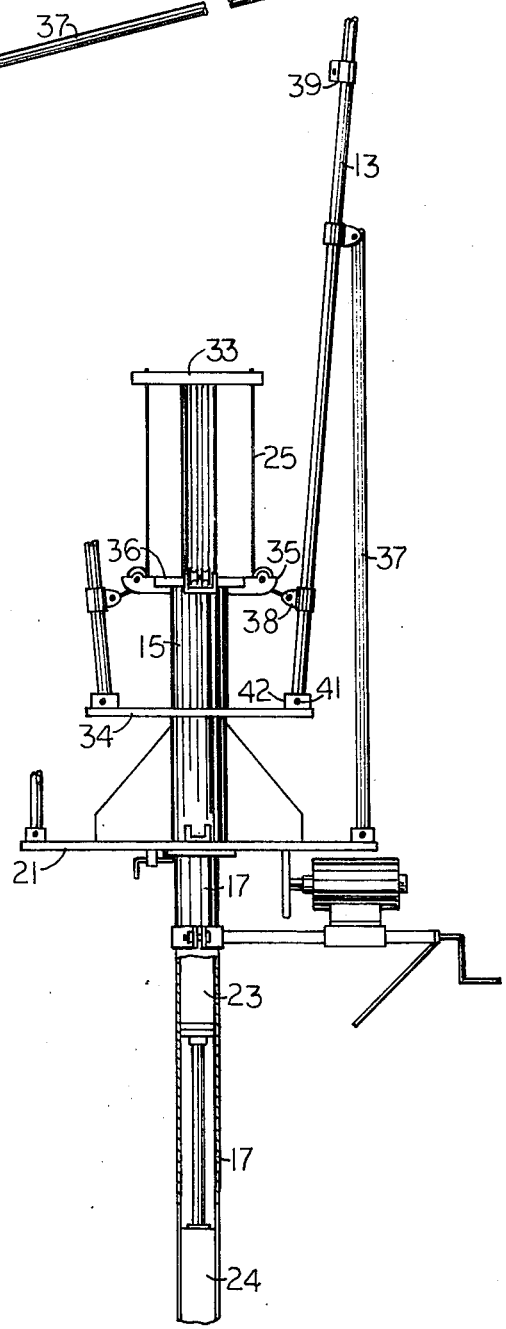
FIG. 6 shows the lifting and mounting means of FIG. 5 positioned to hold booms in a vertical position.

In FIG. 5, the movable member of the jack 24 is retracted while the booms 11–14 are horizontal. As the movable member of the jack 24 is moved upwardly hydraulically, the raising shaft 23 is gradually raised to pull upwardly on the cables 25. The booms 11–14 are therefore raised about their mounting axes or bolts 41 that function as hinge pins, and likewise the brace 37 is turned upwardly within the U-shaped piece 43 until the booms 11–14 are in a vertical position as shown in FIGS. 2 and 6. Typically, the raising shaft 23 is raised 18 inches (45.7 cm) to change the angle of the booms 90°.

The motor 22 as shown in FIGS. 3 and 5 is mounted on a platform comprising two spaced, parallel rails 45 and 46. The outer end of the rails 45 and 46 is bridged by an end piece 47, and the inner ends of the rails are welded to one piece of a two-piece pipe clamp 48–49. The clamp 48–49 is bolted to the standard 17 in a conventional manner at the desired height at which the motor 22 is to be mounted to have its drive wheel 50 contact the lower surface of the driven wheel 21. As shown in FIG. 3, a brace 51 for supporting the outer end of the rails 45 and 46 has its upper, outer end welded or bolted to the outer end of the rails 45 and 46, or to the end piece 47, and its lower inner end welded to a pipe clamp 52 that is secured in a usual manner to the standard 17 at the required distance below the position where the rails 46 and 47 is secured to the standard 17. The perimeter of the drive wheel 50 is pressed tightly against the lower surface of the driven wheel 21, the lower surface being a plane surface from near the hub 15 to its outer edge. When the booms are to be rotated slowly, for example, two revolutions per minute, the motor 22 is positioned outwardly on the rails 45 and 46. As the rate of rotation is to be increased, the motor is moved inwardly so that the drive wheel 50 contacts the lower surface of the wheel 21 at a point closer to its axis.

Figure 7:
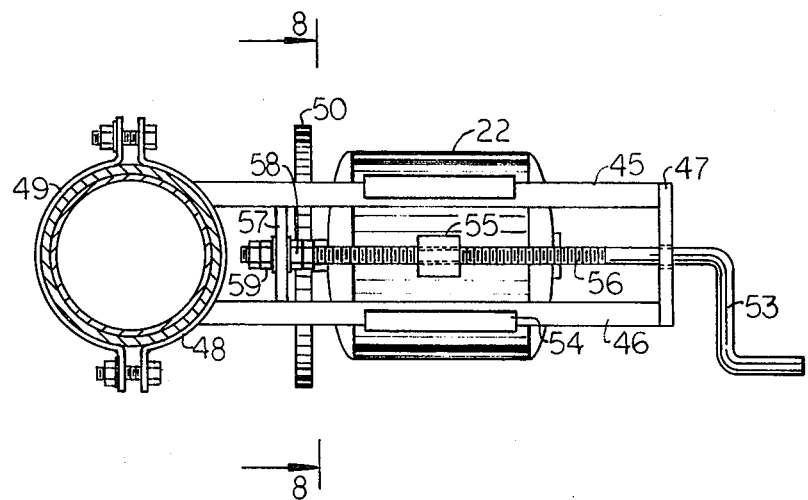
FIG. 7 is a bottom view of an adjustable mounting for the motor.
Figure 8:
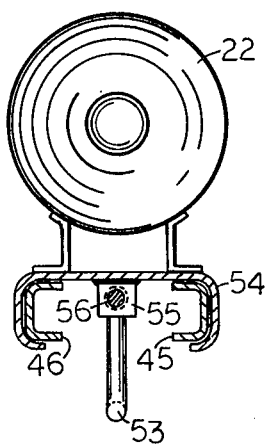
FIG. 8 is a cross-sectional view of the mounting of the motor taken on the line 8—8 of FIG. 7.

A crank 53 of FIG. 3 is rotated to move the motor 22 radially with respect to the driven wheel 21. In more detail with reference to FIGS. 7 and 8, the motor 22 is mounted to a piece of iron channel 54 that has a top portion that fits across the tops of the rails 45 and 46 and opposite side pieces that fit down over the sides of the respective rails and turn inwardly somewhat beneath the lower sides of the rails. A block of steel 55 is welded to the center of the lower surface of the top of the saddle mounting piece 54, and extends downwardly past a central longitudinal axis between the rails 45 and 46. The block 55 has an inside threaded hole along this longitudinal axis, and a long screw 56 is turned into the hole. The screw 56 is first inserted through a hole that functions as a bearing through the end piece 47. At a small distance from the inner ends of the rails 46 and 47, a cross piece 57 is welded in position perpendicularly between the rials 45 and 46. The cross piece has a smooth hole that functions as a bearing in alignment with both the hole in the end piece 47 and the threaded hole in the block 55. Two nuts 58 are turned on the screw 56 before the screw is placed through the hole in the cross piece 57, and afterwards two nuts 59 are placed on the end of the screw 56. The adjacent nuts 58 and 59 are locked together in a usual manner such that they function as thrust bearings on opposite sides of the cross piece 57. The crank 53 may be either an extension of the screw 56 or a separate piece adapted to engage a fitting on the outer end of the screw.

The electric motor 22 is conventional and has reduction gearing between the armature and the output shaft for obtaining the desired slow output speed. Preferably, the motor is reversible and is wired to a reversing switch that is operable to rotate the booms 11–14 in either direction.

I claim:
1. A horse walker comprising:
an upright standard,
a driven wheel having a hub rotatively mounted on said standard for rotation of said driven wheel in a horizontal plane, said driven wheel having a horizontal annular surface about said standard, said annular surface having substantial radial width,
a boom,
means for fastening one end of said boom to said hub, said boom extending radially from said hub for rotation therewith,
a motor having a drive wheel with a driving circumferential surface,
means for mounting said motor to position said driving circumferential surface in firm contact with said horizontal annular surface, the direction of the axis of said drive wheel being radial with respect to the hub of said driven wheel,
means for moving at will said motor radially with respect to said hub to move said drive wheel inwardly and outwardly across said horizontal annular surface such that said drive wheel and said driven wheel cooperate to function as a continuously variable transmission between said motor and said boom.

2. A horse walker as claimed in claim 1 wherein said means for mounting said motor comprises a pair of spaced parallel rails, a mounting base secured to said motor, said mounting base being a sliding fit on said pair of rails for movement longitudinally thereover, said means for moving at will said motor comprises a block extending from said base, a rod with an external thread disposed longitudinally between said rails, said block having a hole with an internal thread for receiving said rod, and cranking means for rotating said rod.

3. A horse walker as claimed in claim 1 wherein said means for fastening one end of said boom is a first hinge means permitting said boom to be turned upwardly about said first hinge means from a horizontal position to a vertical position, and raising means connected between said hub and said boom to raise said boom from said horizontal position to said vertical position.

4. A horse walker as claimed in claim 3 having a plurality of said booms, one of said first hinge means for each of said booms, upper and lower mounting means spaced apart vertically on said hub, said first hinge means being spaced circumferentially about said upper mounting means, a brace for each of said booms, a second hinge means secured to one end of each of said braces, a sleeve secured to the other end of each of said braces, each of said braces being connected between a respective one of said booms through a respective one of said sleeves and to said lower mounting means through a respective one of said second hinge means at a point vertically below said respective first hinge means, said sleeves being a sliding fit about said booms, and said raising means being connected to said booms and operable to raise said booms simultaneously.

5. A horse walker as claimed in claim 4 having a stop for each of said booms, each of said stops being positioned on a respective one of said booms such that the end of a respective one of said sleeves facing outwardly bears against said respective stop to support said respective boom in said horizontal position.

6. A horse walker as claimed in claim 4 wherein said raising means comprises an inner raising shaft positioned vertically for longitudinal sliding movement within said hub, a jack having a movable member supporting said raising shaft, said jack operable to raise said raising shaft from a low position to a high position, cable means connected between said raising shaft and each of said booms at a point spaced from said hub, and said cable means adapted to raise said booms from said horizontal position to said vertical position by movement of said raising shaft from said low position to said high position.

7. An animal exerciser comprising:
a vertically disposed rotatable hub having spaced apart along the length thereof lower mounting means and upper mounting means,
a plurality of rigid booms extending outwardly from said hub, each of said booms having an inner end hinged to said upper mounting means to permit turning of each boom in a vertical plane about the respective one of said hinged ends,
a stop secured to each of said booms intermediate the ends thereof,
a sleeve about each of said booms between said respective hinged end and said respective stop, said sleeves being sliding fits to permit their travel along said respective booms,
a rigid brace connected between said lower mounting means of said hub and each of said sleeves, said braces being hinged at each end thereof to allow turning of said braces with vertical turning of said respective booms, each of said stops being at a predetermined position along the length of the respective boom to support said respective boom in a normal substantially horizontal position while said respective sleeve rests against said respective stop,
means for tethering an animal at each of the other ends of said booms,
means for rotating said hub for rotating said booms about said hub,
a vertically movable member coaxial with said hub, means for raising said vertically movable member from a first position adjacent the upper end of said hub to a second position at a predetermined distance above said hub, said vertically movable member being rotatable about an axis coaxial with said hub,
a flexible member connected between said vertically movable member and each of said booms, each of said flexible members being connected to a respective boom at a distance from said hub equal to approximately the distance between said first and second positions,
said booms being in said normal horizontal positions and supported by said steps while said vertically movable member is in said first position, and said booms being turned upwardly about said respective hinged ends thereof in response to the raising of said vertically movable member until said booms are positioned substantially vertically when said vertically movable member reaches said second position.

* * * * *